US012610033B2

(12) United States Patent
Ishii

(10) Patent No.: US 12,610,033 B2
(45) Date of Patent: Apr. 21, 2026

(54) IMAGE PROCESSING APPARATUS AND STORAGE MEDIUM

(71) Applicant: CANON KABUSHIKI KAISHA, Tokyo (JP)

(72) Inventor: Masatoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 18/314,896

(22) Filed: May 10, 2023

(65) Prior Publication Data

US 2023/0388475 A1 Nov. 30, 2023

(30) Foreign Application Priority Data

May 27, 2022 (JP) ................................. 2022-086708

(51) Int. Cl.
| | |
|---|---|
| *H04N 13/189* | (2018.01) |
| *H04N 13/344* | (2018.01) |
| *H04N 23/698* | (2023.01) |

(52) U.S. Cl.
CPC ......... *H04N 13/189* (2018.05); *H04N 13/344* (2018.05); *H04N 23/698* (2023.01)

(58) Field of Classification Search
CPC .. H04N 13/189; H04N 13/344; H04N 23/698; H04N 13/183; H04N 13/106
USPC ......................................................... 348/36
See application file for complete search history.

(56) References Cited

U.S. PATENT DOCUMENTS

| | | | |
|---|---|---|---|
| 9,412,151 B2 | 8/2016 | Ishii | |
| 9,521,328 B2 * | 12/2016 | Kim | .................... H04N 1/00493 |
| 11,050,925 B2 | 6/2021 | Ogawa | |
| 11,062,423 B2 * | 7/2021 | Kim | ...................... H04N 21/816 |
| 12,307,609 B2 * | 5/2025 | Hamasaki | ................. G06T 7/73 |
| 12,326,980 B2 * | 6/2025 | Suetomi | .................. G06T 11/00 |
| 12,501,142 B2 * | 12/2025 | Takehara | ............... H04N 23/60 |
| 2012/0194544 A1 | 8/2012 | Yokohata | |
| 2017/0322622 A1 * | 11/2017 | Hong | ...................... G06F 3/041 |
| 2018/0041699 A1 * | 2/2018 | Tohara | ................. H04N 13/344 |

(Continued)

FOREIGN PATENT DOCUMENTS

| | | |
|---|---|---|
| JP | 2012-178820 A | 9/2012 |
| JP | 2017-011527 A | 1/2017 |

(Continued)

OTHER PUBLICATIONS

Feb. 3, 2026 Japanese Official Action in Japanese Patent Appln. No. 2022-086708.

*Primary Examiner* — Helen Shibru

(74) *Attorney, Agent, or Firm* — Venable LLP

(57) ABSTRACT

The technique disclosed herein makes it possible to save a proper screenshot, i.e., images with display angles of view of an HMD, and also enable one to check a situation even outside the display angles of view at the time of saving the screenshot. When receiving a notification that a screen capture command is received from a command receiver, an image file generator acquires wide angle images from a wide angle image generator, acquires display angle-of-view information from a display image generator, sets the wide angle images as image data to be stored in a main image region of an image file, sets the acquired display angle-of-view information as data to be stored in a metadata region of the image file, generates an image file of a screenshot according to the settings, and saves the image file in an HDD.

11 Claims, 15 Drawing Sheets

101 102

(56)  References Cited

U.S. PATENT DOCUMENTS

| | | | |
|---|---|---|---|
| 2018/0053280 A1 | 2/2018 | Kim | |
| 2018/0070011 A1* | 3/2018 | Seo | H04N 23/698 |
| 2020/0014843 A1 | 1/2020 | Ogawa | |
| 2020/0358992 A1 | 11/2020 | Ishii | |
| 2022/0049947 A1* | 2/2022 | Tanaka | G06F 3/147 |
| 2023/0244318 A1 | 8/2023 | Suetomi | |
| 2023/0393795 A1* | 12/2023 | Ishii | G06T 3/40 |
| 2024/0185511 A1* | 6/2024 | Tsuru | G06T 15/20 |
| 2024/0378707 A1* | 11/2024 | Ueno | G06T 7/20 |

FOREIGN PATENT DOCUMENTS

| | | | |
|---|---|---|---|
| JP | 2018-023026 A | 2/2018 |
| JP | 2019-525628 A | 9/2019 |
| JP | 2020-010130 A | 1/2020 |
| JP | 2022-006502 A | 1/2022 |

* cited by examiner

101

102

LEFT EYE         RIGHT EYE

RIGHT-EYE IMAGE

LEFT-EYE IMAGE

IMAGE PROCESSING APPARATUS AND STORAGE MEDIUM

BACKGROUND OF THE INVENTION

Field of the Invention

The present invention relates to an image processing technique for a head-mounted display (HMD) and the like.

Description of the Related Art

Heretofore, a video see-through head-mounted display (HMD) has achieved mixed reality (MR) by superimposing computer graphics (CG) images on captured images obtained by imaging an object with an imaging device. In such a video see-through HMD, for example, for the purposes such as facilitating positional alignment between an image to be actually displayed (hereinafter referred to as a display image) and a captured image, an angle of view of the display image (hereinafter referred to as a display angle of view) is set to be narrower than an angle of view of the captured image (hereinafter referred to as a captured angle of view). Therefore, in the case of saving a screenshot in the HMD, not captured images but display images having narrower angles of view are generally saved as an image file. For this reason, the saved image file does not allow one to view a region outside the display angles of view although the region is viewable in the captured image.

Japanese Patent Laid-Open No. 2018-023026 discloses a method for generating an image with a wider angle of view than in display images to be displayed on the HMD, and displaying the image on an external display device.

SUMMARY OF THE INVENTION

The present invention provides an image processing apparatus for a head-mounted display to display a captured image as a display image, the apparatus including a receiver that receives a command to save a screenshot; and a file generator that acquires, from the captured image, a wide angle image corresponding to the display image displayed on the head-mounted display at a time of the issuance of the command, and generates an image file in which the wide angle image is stored, wherein the wide angle image is an image wider in angle of view than the display image, and the file generator acquires display angle-of-view information on the display image and stores the display angle-of-view information as metadata of the image file.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. The following embodiments are not intended to limit the present invention. In addition, all the combinations of features described in the embodiments are not necessarily essential for the solution of the present invention. The same constituents will be described with the same reference sign.

Embodiment 1

One solution is to save, as a screenshot, an image generated by the method disclosed in Japanese Patent Laid-Open No. 2018-023026, that is, an image with a wider angle of view than that of a display image displayed on the HMD. After image capturing, the above solution enables one to view a region outside the display angle of view, which is viewable on the captured image, by referring to the saved image file.

On the other hand, an image with a wider angle of view than that of a display image displayed on the HMD is not an image displayed on the HMD and actually viewed by a viewer, and therefore is not a proper screenshot in that sense.

In Embodiment 1, description will be given of processing for saving a display image on a video see-through HMD as an image file. In the present embodiment, the description will be given of processing for saving an image file having an image file structure including a main image region for storing images with captured angles of view captured with background cameras equipped in an HMD, and a metadata region for storing information specifying display angles of view of the HMD.

Figure 1:
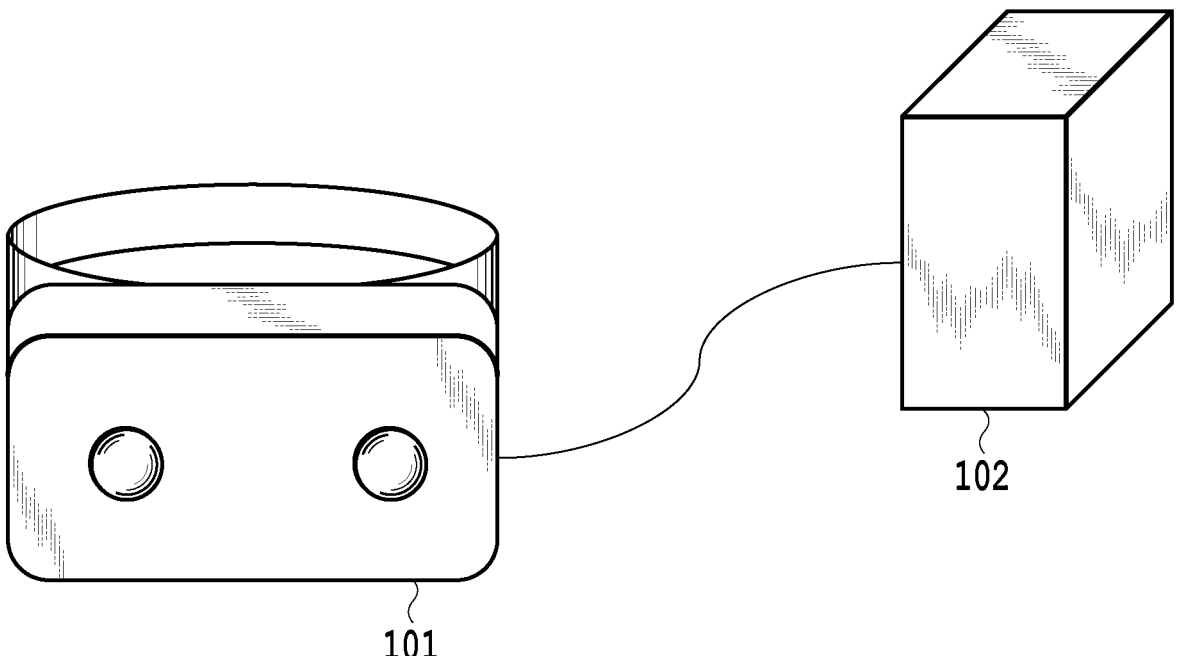
FIG. 1 is a configuration diagram illustrating a video see-through HMD system as an image display system.

FIG. 1 illustrates a configuration of a video see-through HMD system as an image display system in the present invention. A video see-through HMD 101 and an image processing apparatus 102 are connected to each other by a video signal line such as an HDMI cable and a data signal line such as a USB cable, and are enabled to communicate image data and control signals between them.

Figure 2:
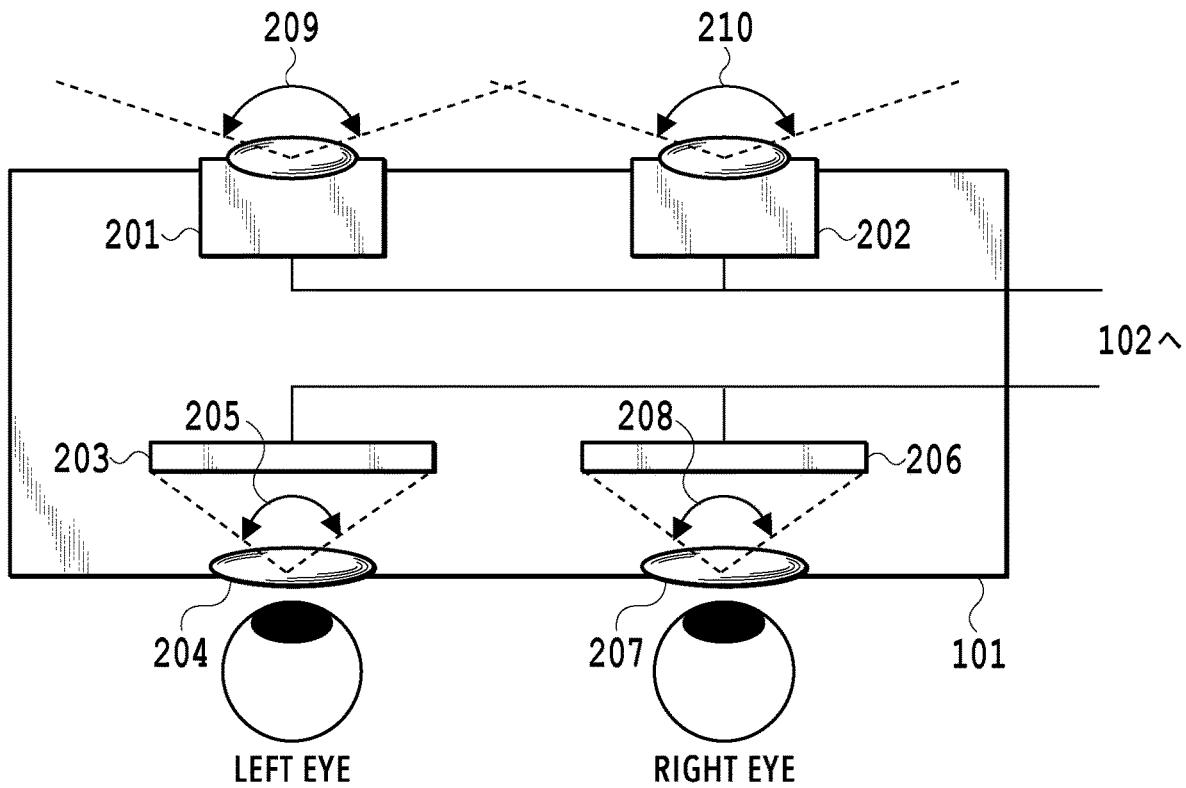
FIG. 2 is an internal configuration diagram of an HMD.

FIG. 2 illustrates an internal configuration of the HMD 101. The video see-through HMD 101 includes a left-eye background camera 201 and a right-eye background camera 202 for obtaining captured images around the HMD 101. The captured angles of view of these background cameras are referred to as a left-eye captured angle of view 209 and a right-eye captured angle of view 210, respectively. In the present embodiment, for the sake of simplification of explanation, the right and left captured angles of view are assumed to be equal to each other and will be also simply referred to as a captured angle of view. In addition, the HMD 101 includes a left-eye display 203 and a right-eye display 206 for presenting images to a viewer of the HMD 101, the displays 203 and 206 each being configured of a display panel such as a liquid crystal panel or an organic EL panel. Moreover, a left-eye eyepiece lens 204 and a right-eye eyepiece lens 207 are arranged in front of the left-eye display 203 and the right-eye display 206, respectively, and the viewer views enlarged virtual images of the display images displayed on the displays through these lenses. The display angles of view of display units including these displays and lenses are referred to as a left-eye display angle of view 205 and a right-eye display angle of view 208, respectively. In the present embodiment, for the sake of simplification of explanation, the right and left display angles of view are assumed to be equal to each other, and will be also simply referred to as a display angle of view. Moreover, it is assumed that the display units are set such that the entire display surfaces of the displays are within the field of view of the viewer and the display angles of view are equal to the angles of view of display images displayed on the displays. In addition to these, the HMD 101 includes various sensors, not illustrated, for obtaining the position and orientation of the viewer.

Here, the captured angles of view of the background cameras 201 and 202, namely, the left-eye captured angle of view 209 and the right-eye captured angle of view 210 are designed to be wider than the display angles of view of the display units, namely, the left-eye display angle of view 205 and the right-eye display angle of view 208, respectively. The HMD 101 is mounted on the head of the viewer not illustrated, and enables the left eye and the right eye of the viewer to see (enlarged virtual images of) a left-eye display image and a right-eye display image.

The image processing apparatus 102 generates a wide angle image by superimposing CG rendered images on the captured images acquired from the left-eye background camera 201 and the right-eye background camera 202 of the HMD 101. Then, the image processing apparatus 102 cuts out image regions corresponding to the display angles of view of the HMD 101 from the wide angle image and sets them as a left-eye display image and a right-eye display image. The image processing apparatus 102 displays these display images on the left-eye display 203 and the right-eye display 206 of the HMD 101.

In the present embodiment, the image processing apparatus 102 is described as having a system configuration independent of the HMD 101. Instead, an integrated HMD system configuration may be employed in which the image processing apparatus 102 is included inside the HMD 101.

Figure 3:
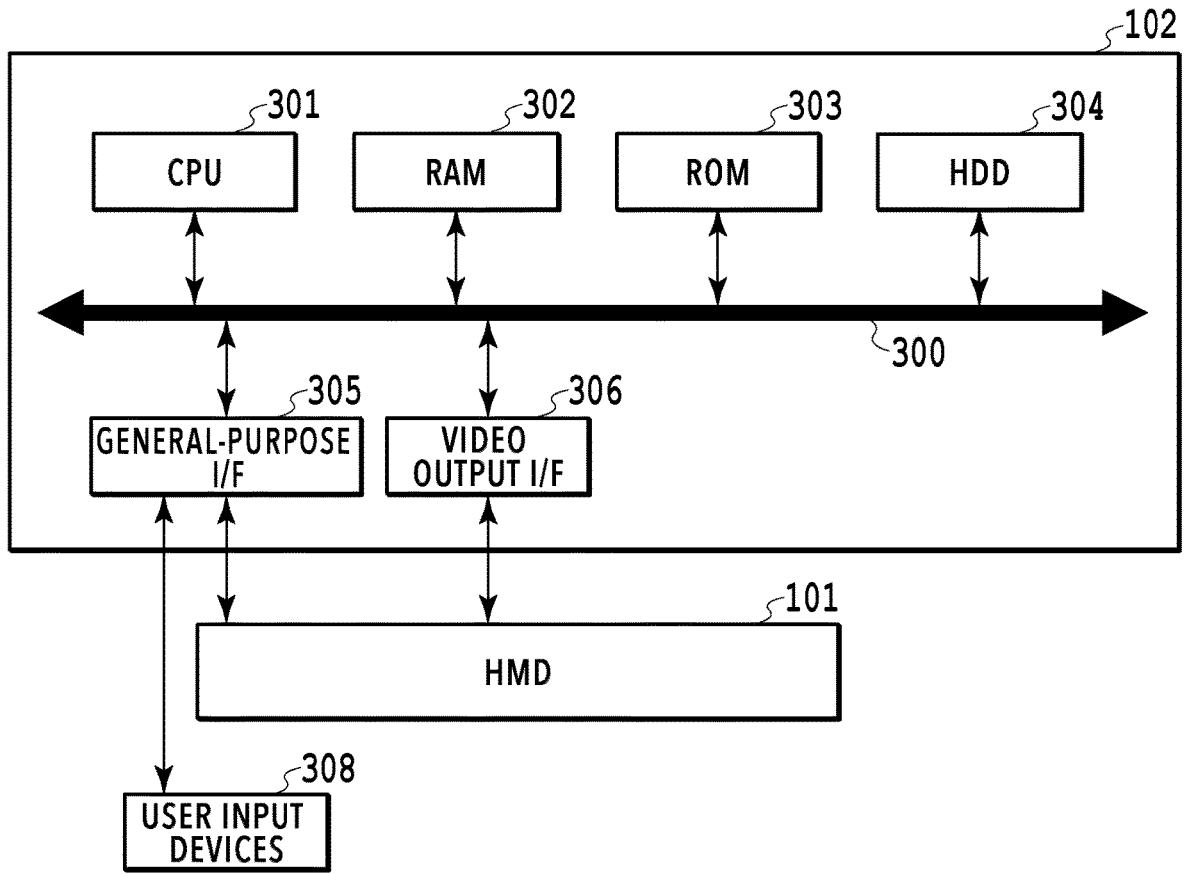
FIG. 3 is a diagram illustrating a system configuration of an image processing apparatus.

FIG. 3 is a diagram illustrating a system configuration of the image processing apparatus 102 of the present invention. The image processing apparatus 102 internally includes a CPU 301, a RAM 302, a ROM 303, a HDD 304, a general-purpose I/F 305, a video output I/F 306, and a video input I/F 307, which are connected to each other through a main bus 300.

The CPU 301 is a processor that centrally controls the components in the image processing apparatus 102. The RAM 302 functions as a main memory, a work area, and the like for the CPU 301. The ROM 303 stores a group of programs to be executed by the CPU 301. The HDD 304 stores applications to be executed by the CPU 301, data to be used for image processing, and the like. The general-purpose I/F 305 is a serial-bus interface such as USB or IEEE1394 and is connected to user input devices 308 such as a keyboard, a mouse, and a controller. Through these user input devices 308, a user is allowed to issue commands such as a screen capture command to capture a screenshot to the image processing apparatus 102. The general-purpose I/F 305 is also connected to the HMD 101 and is used to acquire the captured images from the right and left background cameras and acquire position/orientation information and so on. The video output I/F 306 is an I/F such as HDMI (registered trademark) or a display port, and is used to output display images to the HMD 101.

Figure 4:
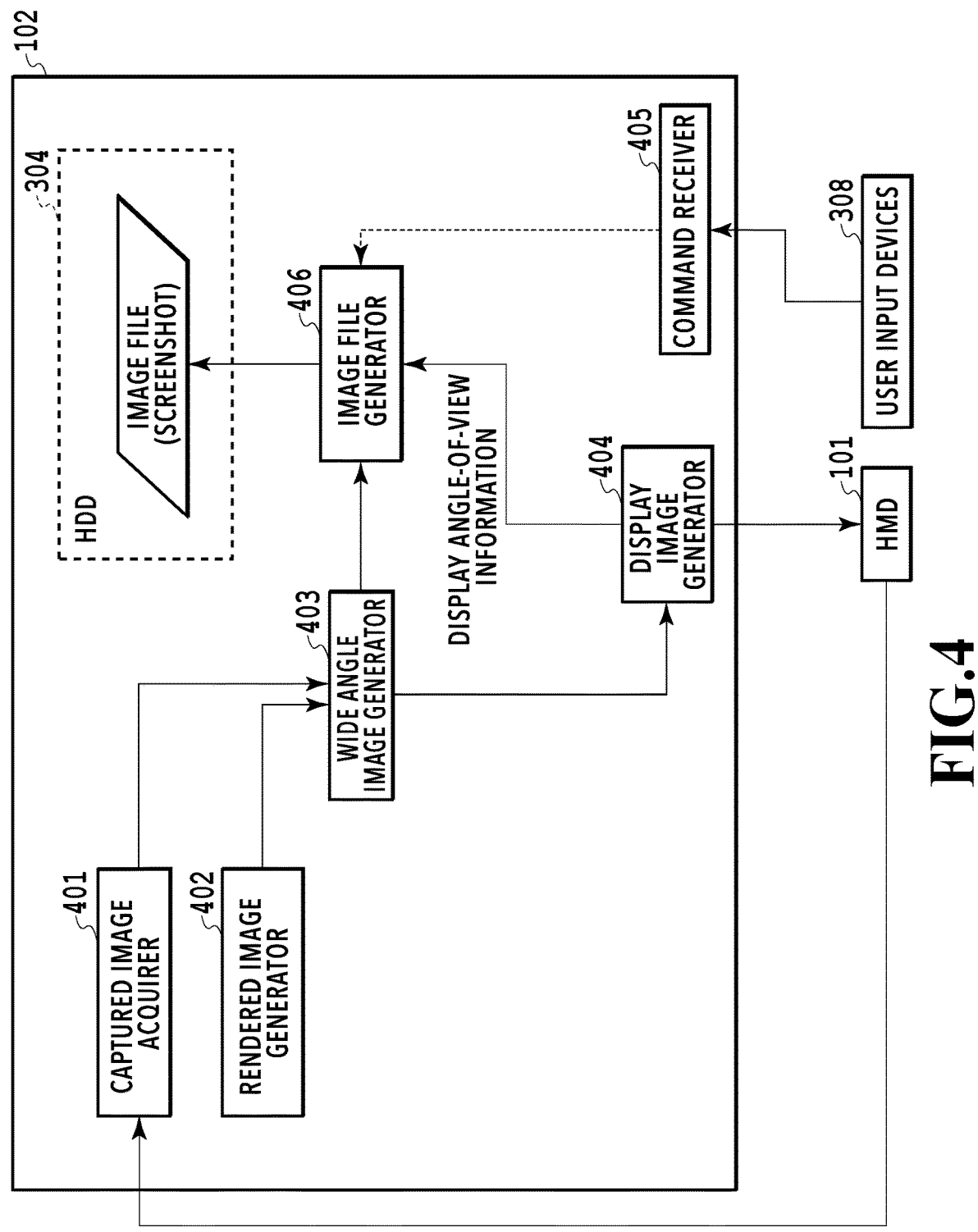
FIG. 4 is a block diagram illustrating functional constituents in an image processing apparatus in Embodiment 1.

FIG. 4 is a block diagram illustrating functional constituents of the image processing apparatus 102 in the present embodiment. In FIG. 4, the image processing apparatus 102 includes a captured image acquirer 401, a rendered image generator 402, a wide angle image generator 403, a display image generator 404, a command receiver 405, and an image file generator 406. The constituents illustrated in FIG. 4 include the constituents for generating display images to be output to the HMD 101 and the constituents for generating an image file of a screenshot.

The captured image acquirer 401 acquires two captured images with parallax from the left-eye background camera 201 and the right-eye background camera 202 and outputs the captured images to the wide angle image generator 403.

The rendered image generator 402 performs CG rendering processing on CG data to generate two-dimensional rendered images to be superimposed on the captured images and outputs the rendered images to the wide angle image generator 403.

The wide angle image generator 403 performs synthesis processing of combining the rendered images and the left-eye and right-eye captured images to generate left-eye and right-eye wide angle images in which the rendered images are superimposed on the captured images, and outputs the wide angle images to the image file generator 406 and the display image generator 404.

The display image generator 404 acquires the wide angle images from the wide angle image generator 403, and acquires display angle-of-view information of the left-eye and right-eye display units of the HMD 101 from the ROM 303 or the HDD 304. The display image generator 404 generates display images based on the acquired wide angle image and display angle-of-view information and outputs the display images to the HMD 101. Note that the display images to be output from the display image generator 404 to the HMD 101 are images with lens distortion corrected so that the images can appear without distortion when viewed through the eyepiece lenses 204 and 207 included in the display units of the HMD 101.

When receiving a screen capture command from the user input devices 308, the command receiver 405 instructs the image file generator 406 to acquire the wide angle images from the wide angle image generator 403.

When instructed to generate an image file of a screenshot from the command receiver 405, the image file generator 406 acquires the wide angle images from the wide angle image generator 403 and acquires the display angle-of-view information from the display image generator 404. The image file generator 406 generates an image file based on the acquired wide angle images and display angle-of-view information and stores the image file in the HDD 304. In the image file generated by the image file generator 406, the wide angle images are stored in the main image region and the display angle-of-view information is stored in the metadata region. Here, the image file generator 406 may acquire the display angle-of-view information directly from the ROM 303 or the HDD 304 instead of the display image generator 404.

Figure 5:
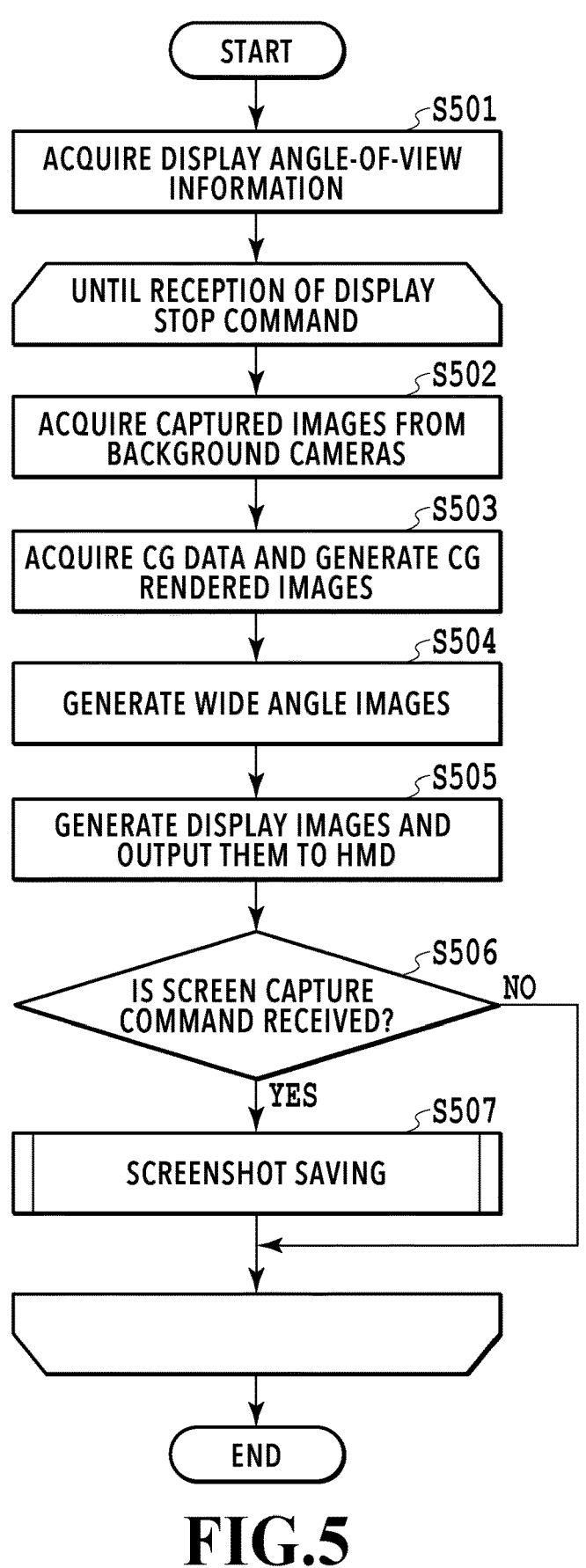
FIG. 5 is a flowchart of processing to be executed by the image processing apparatus in Embodiment 1 for outputting display images to an HMD.
Figure 6:
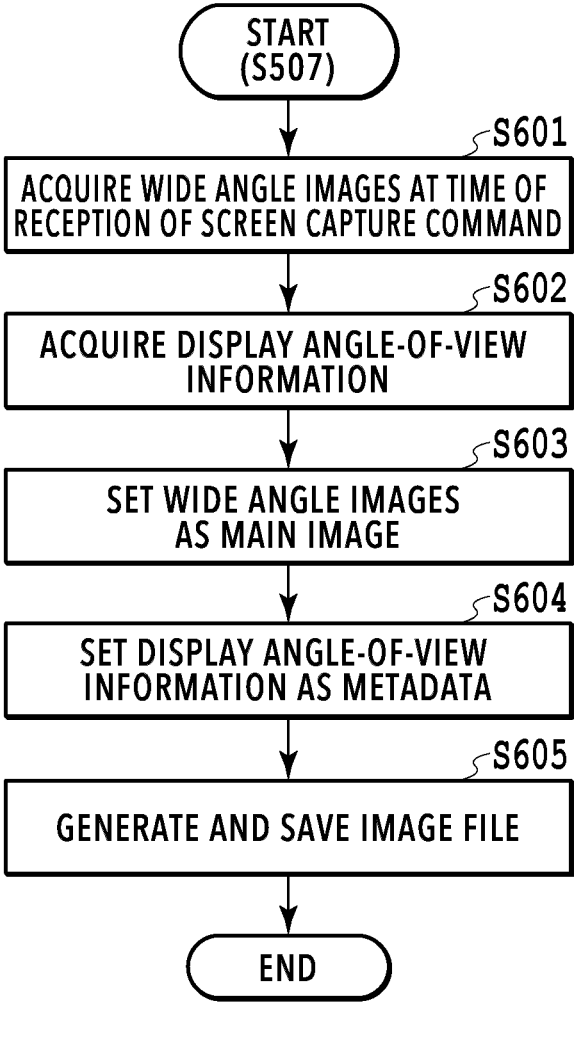
FIG. 6 is a flowchart of processing to be executed by the image processing apparatus in Embodiment 1 for saving a screenshot.

Hereinafter, description will be given of a processing sequence to be executed by the image processing apparatus 102 in the present embodiment upon reception of a screen capture command instructing to save a screenshot from a user viewing images on the HMD 101. FIG. 5 is a flowchart of processing to be executed by the image processing apparatus 102 for generating display images and outputting them to the HMD 101, and FIG. 6 is a flowchart of processing to be executed when a screen capture command is received from a user. The CPU 301 reads out a program to implement the flowchart illustrated in FIG. 5 stored in the ROM 303 or the HDD 304, and executes the program by using the RAM 302 as a work area. In this way, the CPU 301 serves as the functional constituents illustrated in FIG. 4. In the following description of the flowcharts, each step will be expressed by "S".

Figure 8:
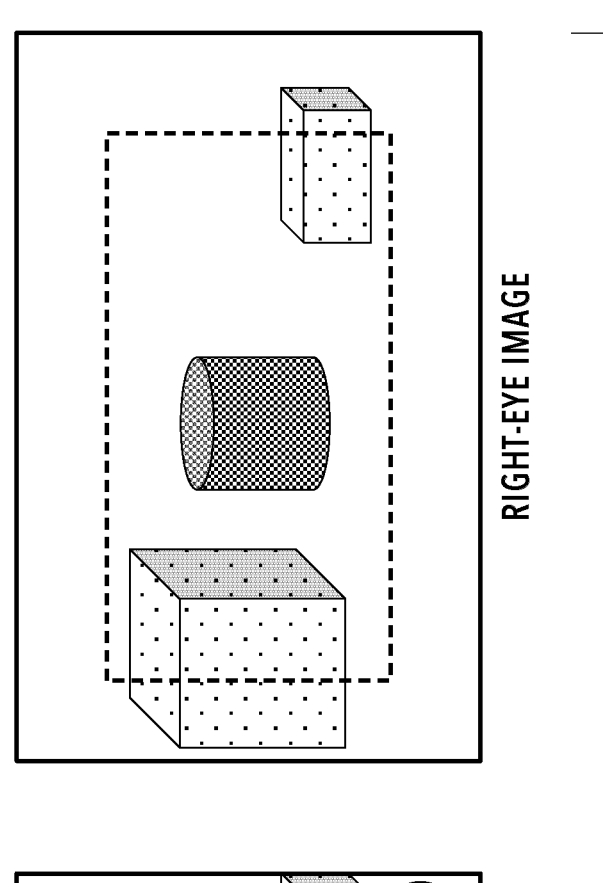
FIG. 8 is a diagram illustrating an example of display angle-of-view information.
Figure 8:
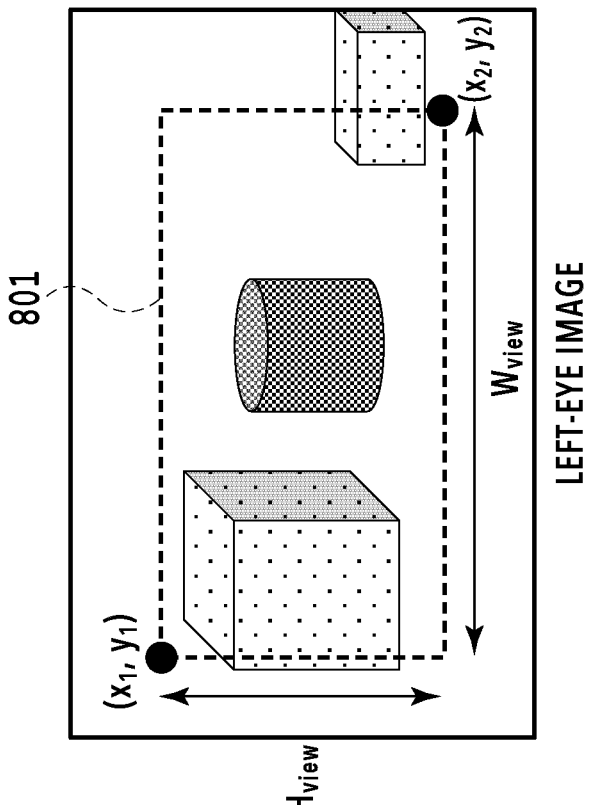

In S501, the display image generator 404 acquires the display angle-of-view information of the HMD 101. The display image generator 404 acquires the display angle-of-view information by reading a vertical angle of view and a horizontal angle of view stored in advance as device information of the HMD 101 in the ROM 303 or HDD 304. In the present embodiment, it is assumed that the center of a wide angle image coincides with the center of the corresponding display image, and that the display image can be cut out from the wide angle image based on the display angle-of-view information. When there is a gap between the centers of the wide angle image and the display image, the display angle-of-view information only has to contain information on the gap between the centers. Although the description is given herein about the example in which the vertical angle of view and the horizontal angle of view stored in advance as the device information of the HMD 101 are used as the display angle-of-view information, the display angle-of-view information is not limited to this. For example, as illustrated in FIG. 8, upper left coordinates (x1, y1), a width Wview, and a height Hview of a rectangular region 801 on the wide angle image corresponding to a display angle of view calculated from a relationship among the vertical angle of view, the horizontal angle of view, and the captured angle of view may be acquired as the display angle-of-view information. Instead, upper left coordinates (x1,y1) and lower right coordinates (x2, y2) of opposite vertices of the rectangular region 801 on the wide angle image corresponding to the display angle of view may be acquired as the display angle-of-view information.

S502 to S507 are steps for generating and outputting each of frames of the display images, the steps iterated by the image processing apparatus 102 until a command to stop displaying display images on the HMD 101 is received.

Figures 7A, 7B, 7C:
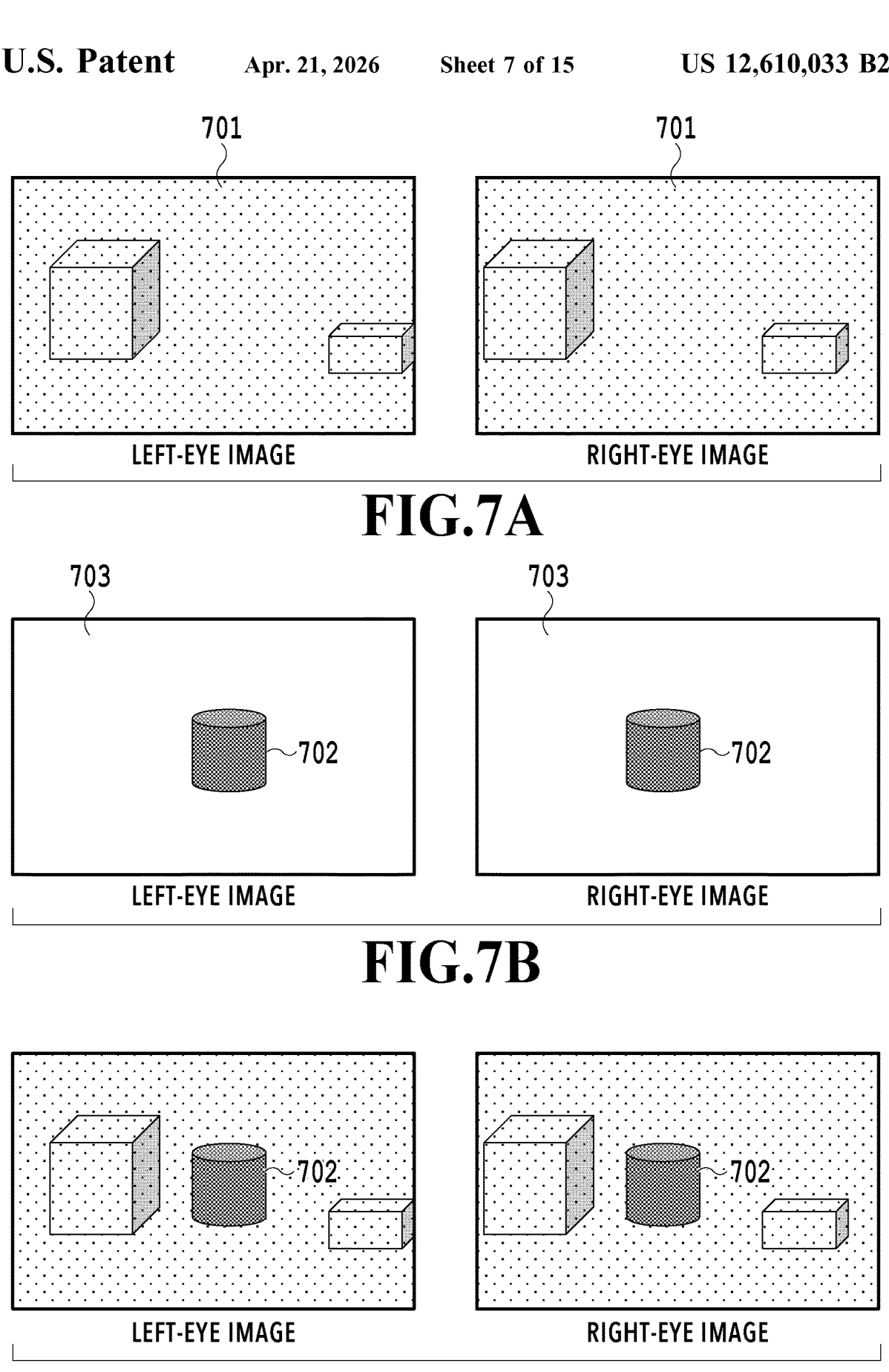
FIG. 7A is a diagram illustrating captured images.
FIG. 7B is a diagram illustrating rendered images.
FIG. 7C is a diagram illustrating wide angle images.

In S502, the captured image acquirer 401 acquires captured images with the captured angle of view from the left-eye background camera 201 and the right-eye background camera 202. FIG. 7A illustrates an example of the captured images. The left-eye background camera 201 and the right-eye background camera 202 are arranged at such different positions that the acquired left-eye and right-eye captured images can be stereoscopic images having parallax.

In S503, the rendered image generator 402 reads out CG data for rendered images to be superimposed on the captured images to the RAM 302, and performs CG rendering processing on the CG data to generate two-dimensional rendered images. In the CG rendering processing, the rendering processing is performed under the setting where angles of view of the rendered images are equal to the captured angle of view. FIG. 7B illustrates an example of the rendered images. Reference sign 702 presents a CG object to be used for display on the rendered image, and reference sign 703 presents a transparent region other than the CG object to be used for the display. For synthesis processing in the following steps, the transparent region 703 is filled with a color surely distinguishable from the CG object 702, or alpha values in the region 703 are set such that the region 703 can be distinguished from the CG object 702.

In S504, the wide angle image generator 403 synthesizes right and left wide angle images by combining the right and left captured images acquired in S501 and the right and left rendered images generated in S502. FIG. 7C illustrates an example of the wide angle images. The CG object 702 in the rendered image excluding the transparent region 703 is combined with the captured image. The synthesis processing is executed by blending the captured image and the rendered image on a pixel-by-pixel basis. A blend ratio therefor may be determined based on an anteroposterior relationship between the CG object 702 and the captured image based on distance images separately generated for both of the captured image and the rendered image. In the distance image, data of a distance to the object is recorded for each pixel. The blend ratio may be binary, 0 or 1. Note that the distance image for the captured image may be generated by performing stereo matching processing on the right and left captured images having parallax captured by the right and left background cameras, or by additionally providing the HMD 101 with distance sensors. The distance image for the rendered image may be generated by setting a distance to a pixel corresponding to the CG object 702 according to a predetermined distance determination method. Through the above processing, the wide angle image is an image generated with a captured angle of view wider than the display angle of view of the HMD 101. The wide angle image may be generated based on at least the captured image, or may be a wide angle image generated only from the captured image not combined with the rendered image.

Figure 9:
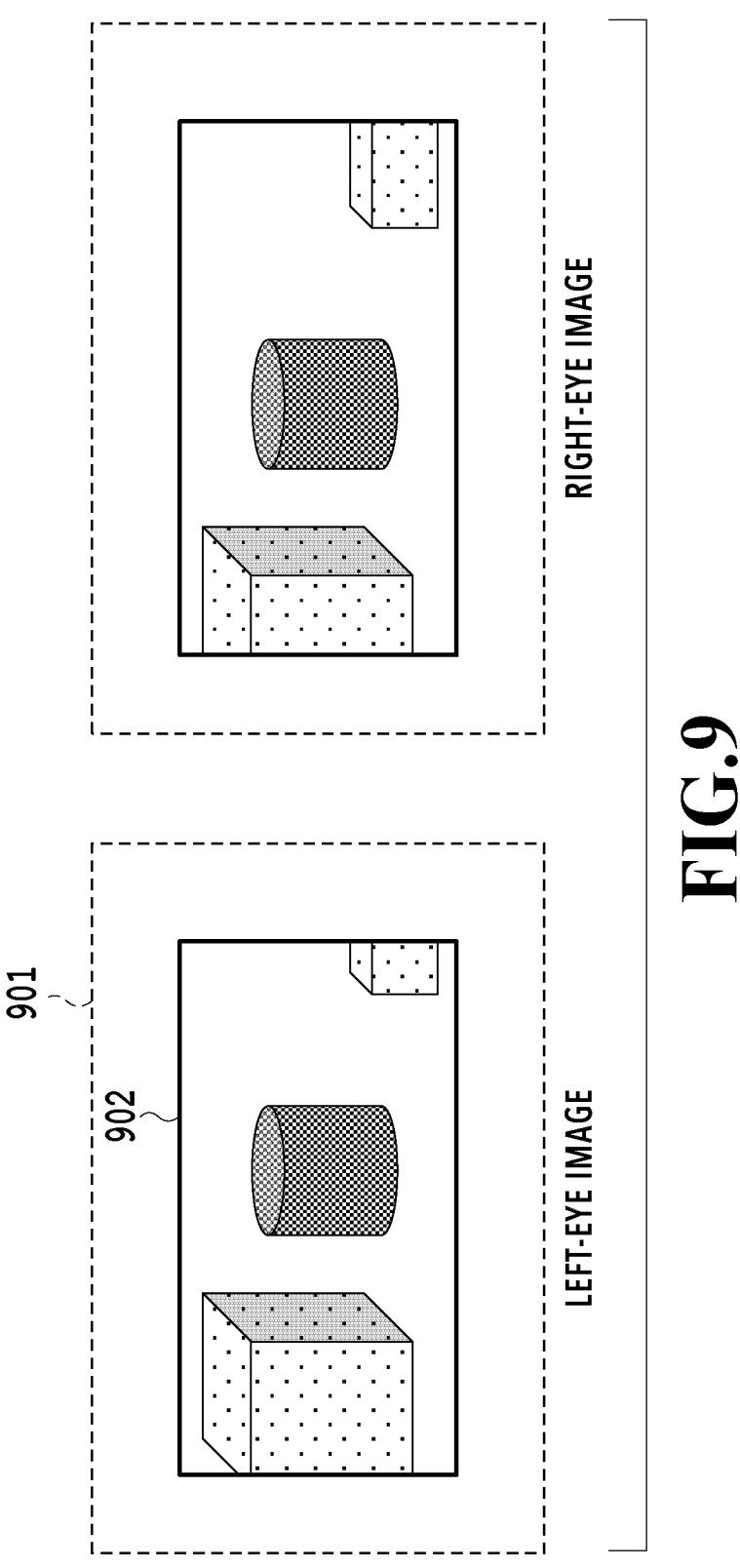
FIG. 9 is a diagram illustrating display images.

In S505, the display image generator 404 cuts out a region corresponding to the vertical angle of view and the horizontal angle of view specified by the display angle-of-view information from each of the wide angle images, corrects lens distortion on the cut-out images to generate right and left display images, and outputs the display images to the HMD 101. FIG. 9 illustrates an example of the display images. Reference sign 901 is an auxiliary line indicating the size of the wide angle image. Reference sign 902 illustrates the display image, that is an image of a cut-out part of the wide angle image 901.

In S506, the command receiver 405 determines whether or not a screen capture command is received, and proceeds to S507 when the screen capture command is received or returns to S502 when the screen capture command is not received.

In S507, the image file generator 406 executes processing for saving a screenshot. The details of S507 will be described later by using FIG. 6. The image processing apparatus 102 is configured herein to perform the processing in S501 to S507 sequentially, but may be configured to perform the processing in S507 in parallel with the processing in S502 to S506.

Next, using FIG. 6, description will be given of the details of the screenshot saving processing (S507) executed by the image processing apparatus 102 when a screen capture command is received from the user input devices 308.

In S601, when receiving a notification that a screen capture command is received from the command receiver 405, the image file generator 406 acquires the wide angle images from the wide angle image generator 403. Here, if a non-negligible delay occurs from the reception of the screen capture command to the output of the wide angle images, wide angle images generated a predetermined time ago may be used as the wide angle images output from the wide angle image generator 403 to the image file generator 406.

In S602, the image file generator 406 acquires the display angle-of-view information from the display image generator 404. If the image file generator 406 acquires the display angle-of-view information in advance, this step may be skipped.

Figure 10:
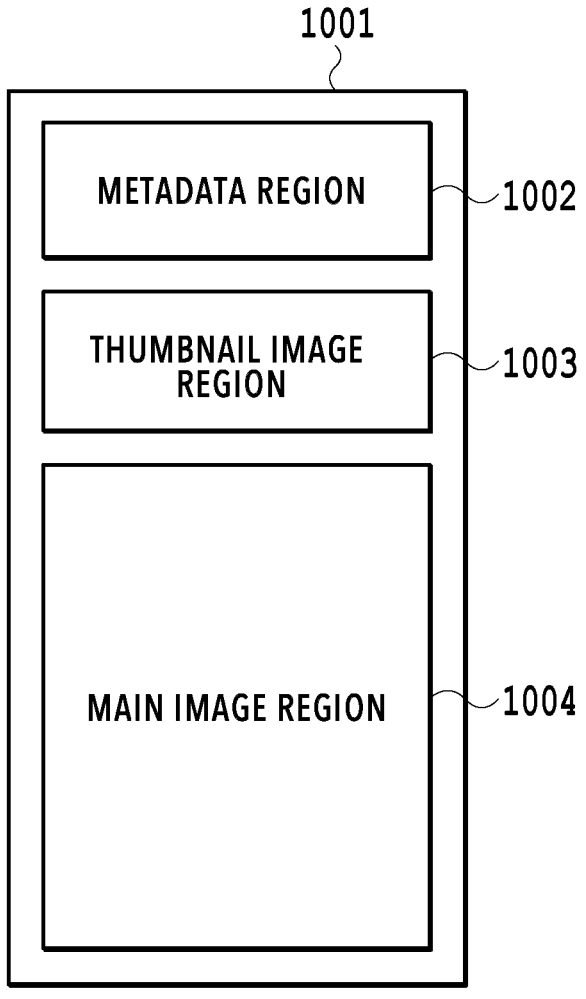
FIG. 10 is a diagram illustrating a structure of an image file of a screenshot.

In S603, the image file generator 406 sets the wide angle images acquired in S601 as image data to be stored in a main image region 1004 of an image file. FIG. 10 illustrates an example of a general image file format such as Exif-JPEG. An image file 1001 for saving a screenshot includes a metadata region 1002 for storing metadata such as image size and resolution, a thumbnail image region 1003 for storing a thumbnail image, and a main image region 1004 for storing a main image. In the present embodiment, wide angle images are set as image data to be stored in the main image region 1004.

In S604, the image file generator 406 sets, as data to be stored in the metadata region 1002, the display angle-of-view information acquired in S602, namely, the numerical values of the vertical angle of view and the horizontal angle of view of display images to be displayed on the HMD 101.

In S605, the image file generator 407 generates an image file of a screenshot according to the settings in S603 and S604, and saves the image file in the HDD 304.

Through the above processing, in saving a screenshot of the HMD 101, an image file can be generated in which images with the captured angle of view wider than the display angle of view of the HMD 101 are stored as the main image and the display angle-of-view information of the HMD 101 is stored as the metadata. As a result, when opening the image file and displaying the screenshot, it is possible to display not only the images with the display angle of view of the HMD 101 but also the surrounding images not viewable by the viewer when the screenshot was saved.

Embodiment 2

In Embodiment 2, description will be given of processing for setting a display image generated with a display angle of view as a thumbnail of an image file of a screenshot in addition to the processing in Embodiment 1. Since the processing to be executed by the image processing apparatus 102 for generating display images and outputting the display images to the HMD 101 is the same as in Embodiment 1, the description thereof will be omitted below.

Figure 11:
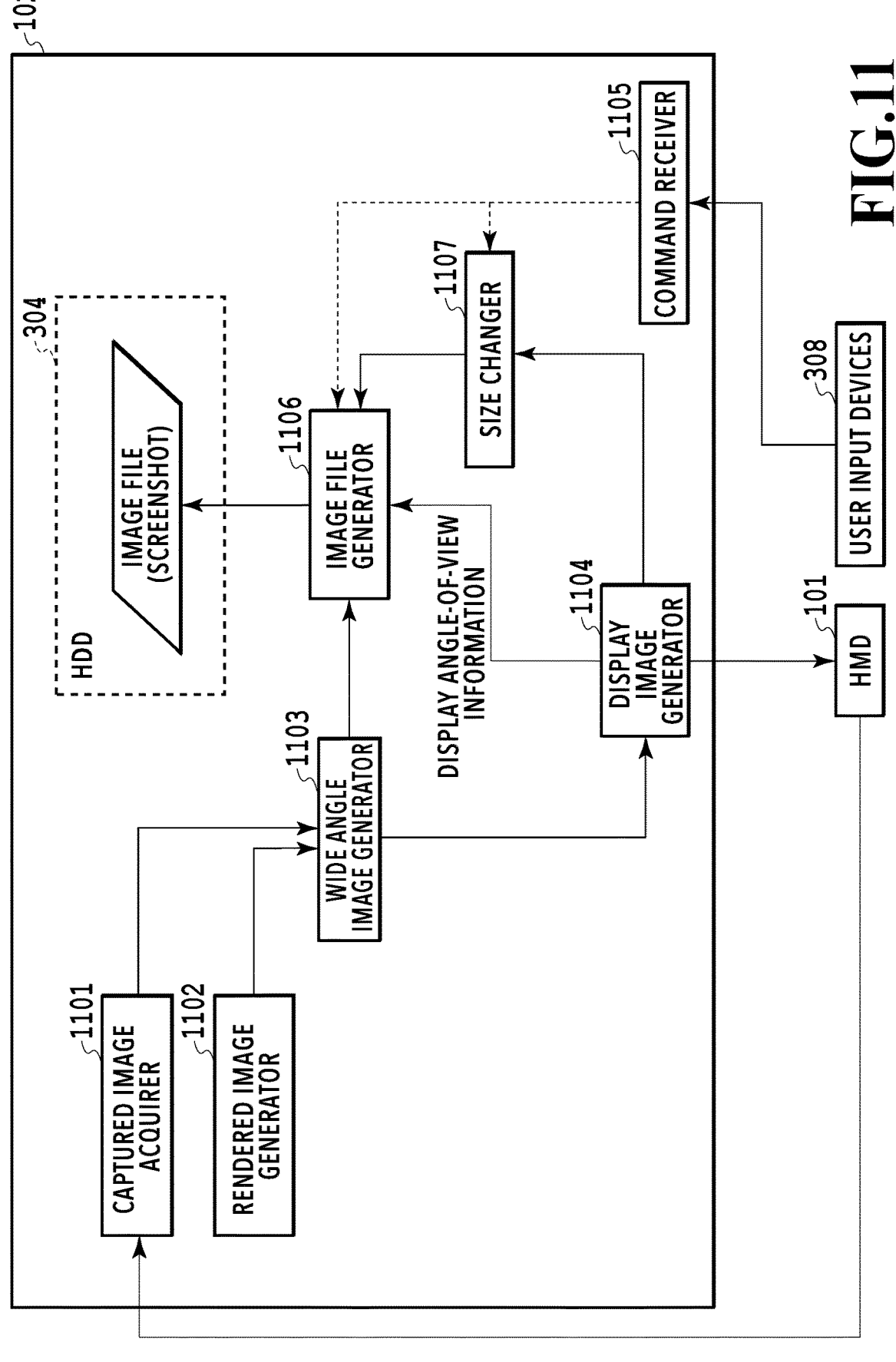
FIG. 11 is a block diagram illustrating functional constituents in an image processing apparatus in Embodiment 2.

FIG. 11 is a block diagram illustrating functional constituents in an image processing apparatus 102 in the present embodiment. The image processing apparatus 102 in the present embodiment includes a size changer 1107 in addition to the constituents included in the image processing apparatus 102 in Embodiment 1. Here, description will be given only of points about the size changer 1107 as a difference from Embodiment 1, while omitting the description of the constituents 1101 to 1106 having the same functions as the constituents in Embodiment 1 illustrated in FIG. 4.

When receiving a notification that the command receiver 1105 received a screen capture command, the size changer 1107 acquires a display image before lens distortion correction generated by the display image generator 1104. The size changer 1107 reduces the file size of the acquired display image to generate a reduced image of the display image and outputs the reduced image to the image file generator 1106.

Figure 12:
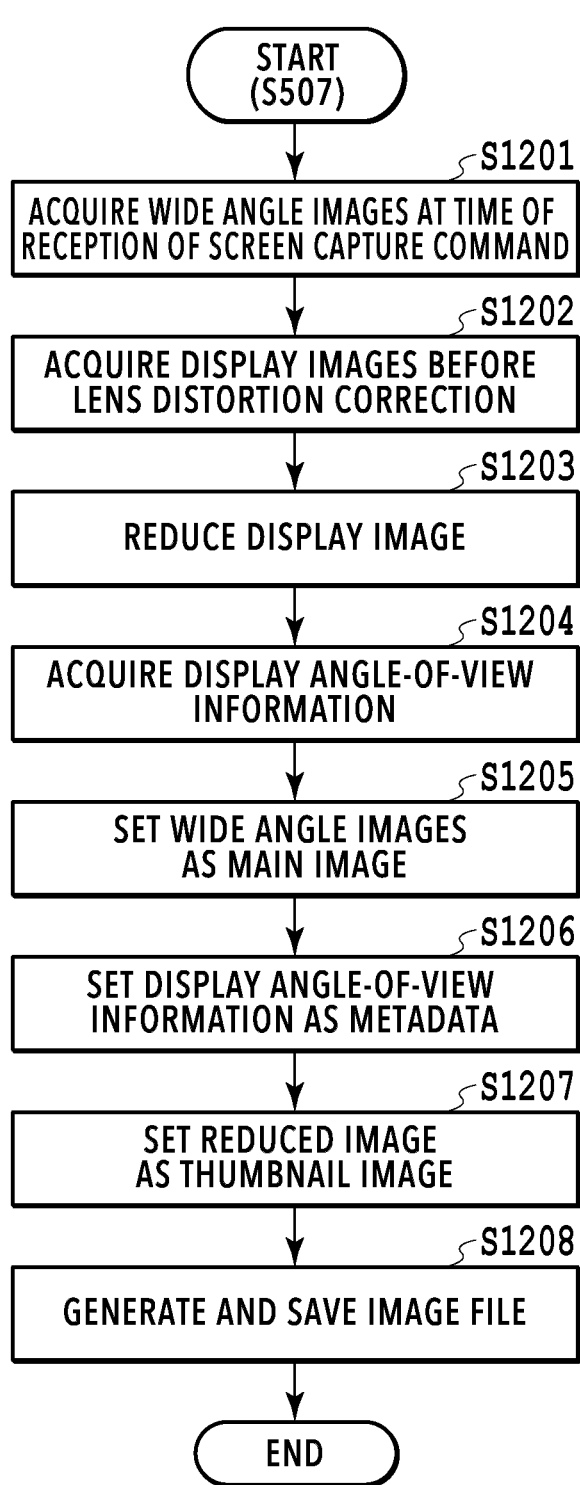
FIG. 12 is a flowchart of processing to be executed by the image processing apparatus in Embodiment 2.

Hereinafter, using FIG. 12, description will be given of the details of the screenshot saving processing (S507) to be executed by the image processing apparatus 102 when a screen capture command is received from the user input devices 308. FIG. 12 is a flowchart of the screenshot saving processing to be executed by the image processing apparatus 102. The CPU 301 reads out a program for implementing the flowchart illustrated in FIG. 12 stored in ROM 303 or HDD 304 and executes the program by using the RAM 302 as a work area. In this way, the CPU 301 serves as the functional constituents illustrated in FIG. 11. In the following description of the flowchart, each step will be expressed by "S".

Since S1201 and S1204 to S1206 are the same processing as in S601 to S605 in the flowchart illustrated in FIG. 6 in Embodiment 1, the description thereof will be omitted below.

In S1202, the size changer 1107 acquires a display image before lens distortion correction from the display image generator 1104.

In S1203, the size changer 1107 reduces the display image acquired in S1202 to a size according to the specifications of a thumbnail image for an image file format, thereby performing reduced image generation processing to generate the reduced image. The size changer 1107 outputs the generated reduced image of the display image to the image file generator 1106.

In S1207, the image file generator 1106 sets the thumbnail image generated in S1203 as image data to be stored in the thumbnail image region 1003.

In S1208, the image file generator 1106 generates an image file of a screenshot according to the settings in S1205 to S1207, and saves the image file in the HDD 304.

Through the above processing, in saving a screenshot of the HMD 101, an image file can be generated in which images with the captured angle of view wider than the display angle of view of the HMD 101 are stored as the main image, and the image with the display angle of view of the HMD 101 is stored as the thumbnail image. Thus, the thumbnail image is the same image as the screenshot, which makes it easier to identify the image file. Moreover, when opening the image file and displaying the screenshot, it is possible to display not only the images with the display angle of view of the HMD 101 but also the surrounding images not viewable by the viewer when the screenshot was saved.

Embodiment 3

In a case where CG is placed on a real world and viewed in a video see-through HMD, the CG is often a main object. Therefore, in Embodiment 3, description will be given of processing for determining whether or not a CG object is within the display angle of view and switching an image to be set in the main image region 1004 based on the determination result.

Figure 13:
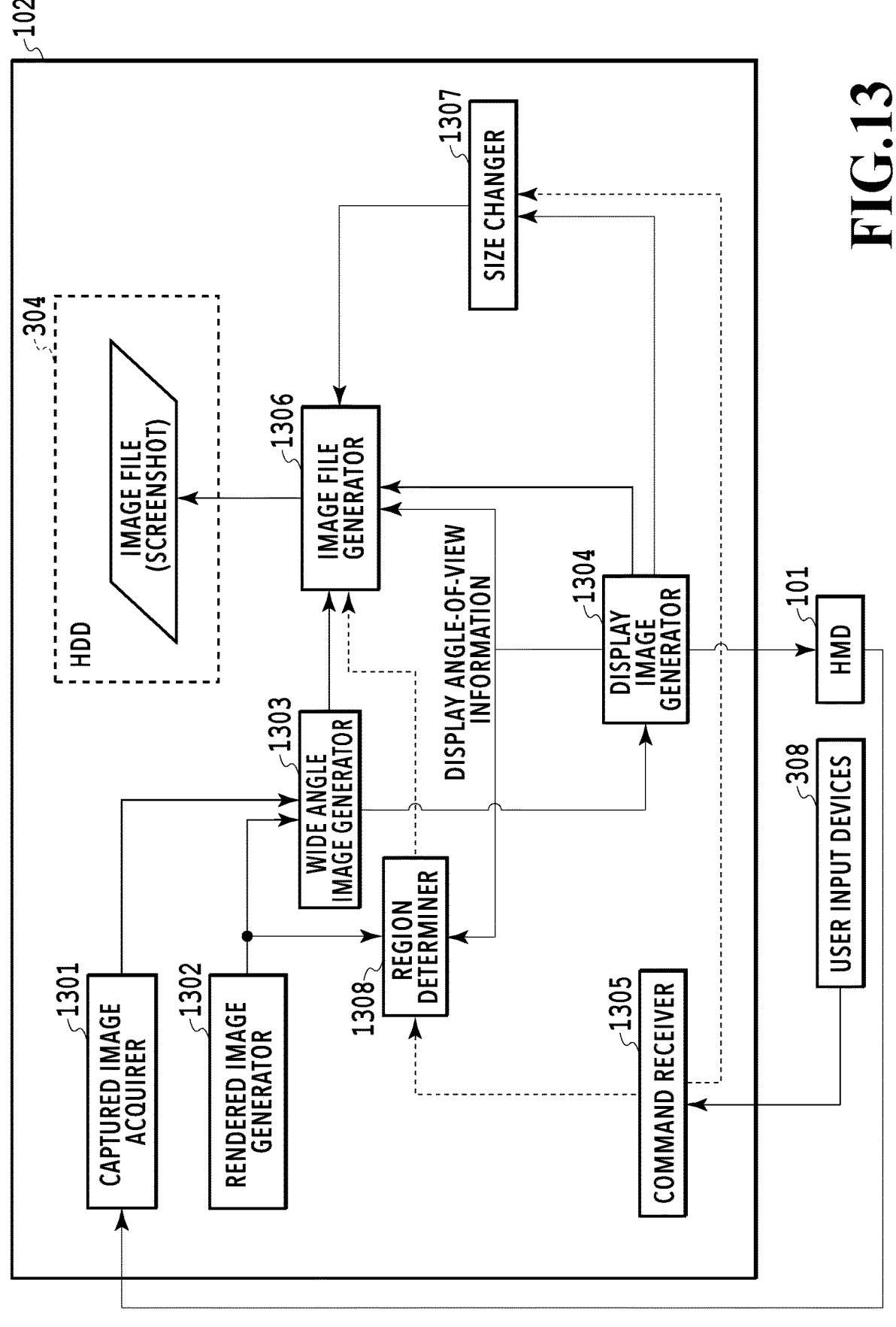
FIG. 13 is a block diagram illustrating functional constituents in an image processing apparatus in Embodiment 3.

FIG. 13 is a block diagram illustrating functional constituents in an image processing apparatus 102 in the present embodiment. The image processing apparatus 102 in the present embodiment includes a region determiner 1308 in addition to the constituents included in the image processing apparatus 102 in Embodiment 2. Here, description will be given only of points about the region determiner 1308 as a difference from Embodiment 2, while omitting the description of the constituents 1301 to 1307 having the same functions as the constituents in Embodiment 2 illustrated in FIG. 11.

The region determiner 1308 determines whether a CG object on each rendered image is within the display angle of view based on the display angle-of-view information and outputs the determination result to the image file generator 1306. The image file generator 1306 stores the wide angle images or the display images into the main image region 1004 of an image file based on the determination result of the region determiner 1308.

Figure 14:
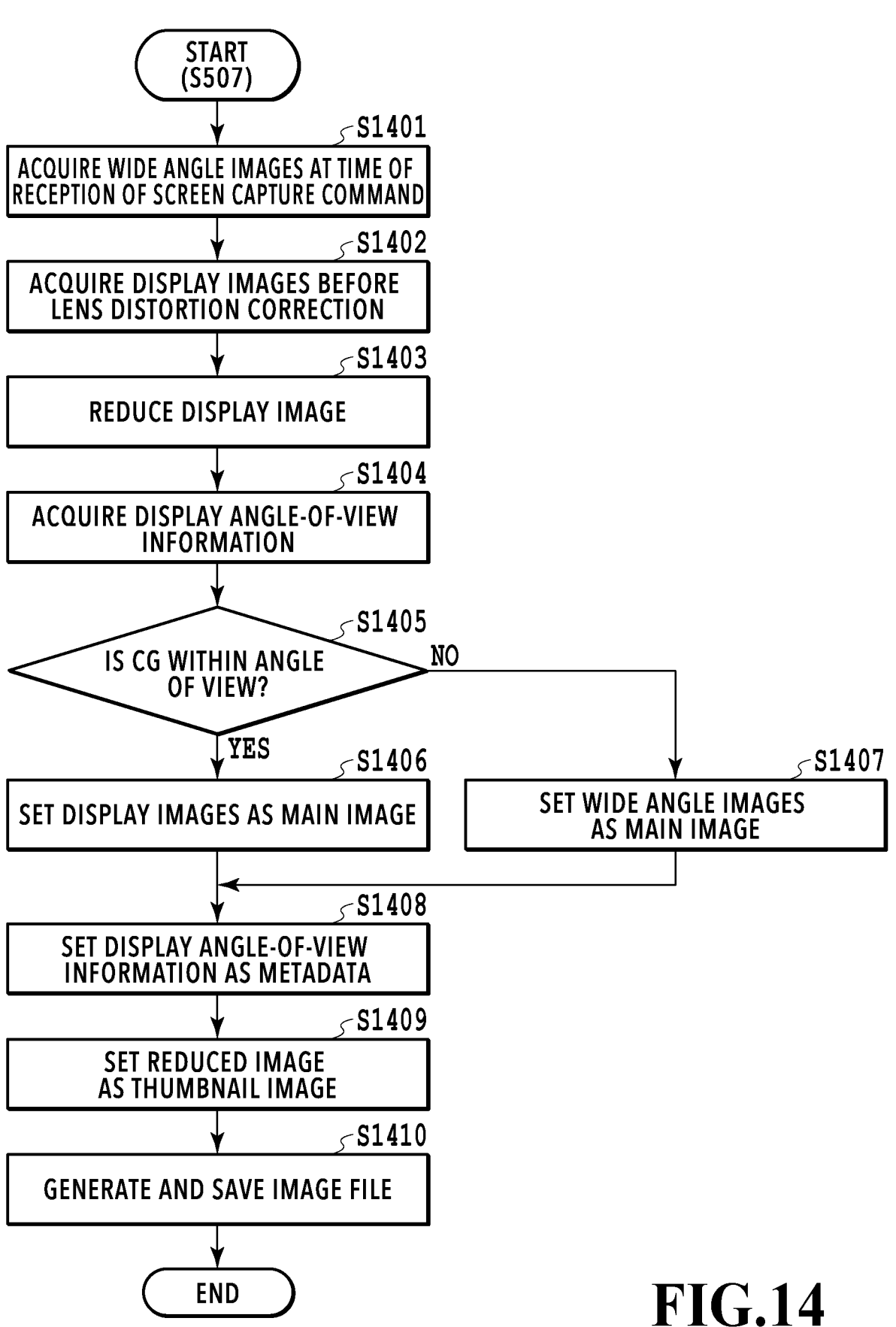
FIG. 14 is a flowchart of processing to be executed by the image processing apparatus in Embodiment 3.

Hereinafter, description will be given of a processing sequence to be executed by the image processing apparatus 102 in the present embodiment upon reception of a screen capture command from a user. FIG. 14 is a flowchart of processing to be executed by the image processing apparatus 102. The CPU 301 reads out a program for implementing the flowchart illustrated in FIG. 14 stored in ROM 303 or HDD 304 and executes the program by using the RAM 302 as a work area. In this way, the CPU 301 serves as the functional constituents illustrated in FIG. 13. In the following description of the flowchart, each step will be expressed by "S".

Since S1401 to S1404 are the same processing as in S1201 to S1204 in the flowchart illustrated in FIG. 12 in Embodiment 2, the description thereof will be omitted below.

Figure 15:
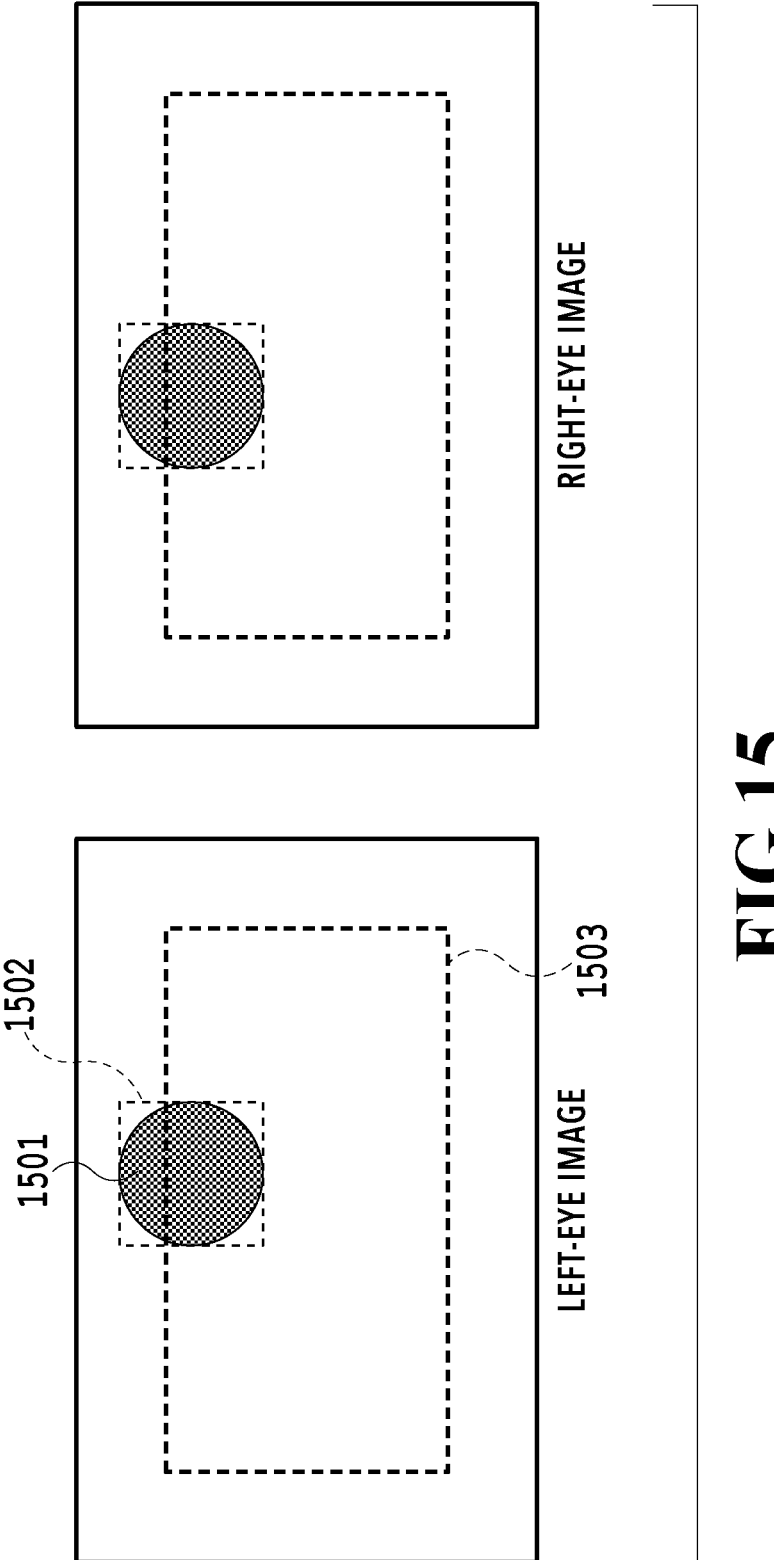
FIG. 15 is a diagram illustrating a relationship between a display angle of view and a CG object.

In S1405, the region determiner 1308 determines whether a CG object on each of the rendered images generated in S503 is within the display angle of view based on the vertical angle of view and the horizontal angle of view, that is, the display angle-of-view information acquired in S1404. FIG. 15 is a diagram illustrating a relationship among a CG object 1501 on each of the right and left rendered images generated with the captured angle of view, a bounding box 1502 which is a rectangle surrounding the CG object 1501, and an image region 1503 corresponding to the display angle of view. In this step, to determine whether the CG object is within the display angle of view, the bounding box 1502 of the CG object 1501 and the image region 1503 corresponding to the display angle of view are compared in terms of a positional relationship on the rendered image. The processing proceeds to S1406 if the bounding box 1502 is completely within the image region 1503 or proceeds to S1407 if the bounding box 1502 extends beyond the image region 1503.

In S1406, the image file generator 1306 sets the display images acquired in S1402 as the image data to be stored in the main image region 1004 of an image file.

In S1407, the image file generator 1306 sets the wide angle images acquired in S1401 as the image data to be stored in the main image region 1004 of the image file.

S1408 to S1410 are the same as S1206 to S1208 in the flowchart illustrated in FIG. 12 in Embodiment 2.

In S1410, the image file generator 1306 generates an image file of a screenshot according to the setting in S1406 or S1407 and the settings in S1408 and S1409, and saves the image file in the HDD 304.

When the display images are set as the image data to be stored in the main image region 1004 of the image file in S1406, S1408 for storing the display angle-of-view information into the metadata region 1002 may be skipped.

Through the above processing, in saving a screenshot of the HMD 101, images set as a main image can be switched between the images with the captured angle of view and the images with the display angle of view depending on whether or not a target CG object is within the display angle of view. As a result, even if the entire CG object was not within the display angle of view of the HMD when a screenshot was saved, when opening the image file and displaying the screenshot later, it is possible to display a part of the CG object that lies outside the display angle of view afterward. On the other hand, if the target CG object is entirely within the display angle of view, the display images smaller in image size than the wide angle images are set as the main image, making it possible to reduce the file size of the image file to be saved. When the display images are set as the main image, this provides confirmation that the target CG object does not extend beyond the display angle of view.

OTHER EMBODIMENTS

The configurations in Embodiments 1 to 3 use images generated to be output to the HMD 101 as the wide angle images or the display images to be stored in the image file, but are not limited to the above case. For example, when a screen capture command is received, wide angle images or display images to be stored in an image file may be newly generated in addition to the images generated to be output to the HMD 101.

Moreover, although the example in which a still image file is saved as a screenshot is described in Embodiments 1 to 3, the same effects can be obtained also in the case where a video image file is saved as a screenshot. In a video file format in this case, a metadata region may store the display angle-of-view information, a thumbnail image region may store image data obtained by extracting and reducing a certain one frame in the display image, and a main image region may store video image data of the wide angle images or the display images.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, it is possible to save a proper screenshot, that is, images with display angles of view of an HMD, and also additionally enable one to check a situation even outside the display angles of view at the time of saving the screenshot.

This application claims the benefit of Japanese Patent Application No. 2022-086708 filed May 27, 2022, which is hereby incorporated by reference herein in its entirety.

What is claimed is:

1. An image processing apparatus for a head-mounted display to display a display image based on a captured image, the image processing apparatus comprising:
   a receiver that receives a user instruction to save a screenshot; and
   a file generator that acquires (1) a wide-angle image corresponding to the display image displayed on the head-mounted display at a time of the issuance of the user instruction, the wide-angle image being an image wider in angle of view than the display image, and (2) angle-of-view information including an angle of view of the display image,
   wherein the file generator generates an image file having a predetermined file format in which the display image is stored, in accordance with a predetermined object being entirely within an image region specified by the angle-of-view information, and
   wherein the file generator generates an image file having a predetermined file format in which (1) the wide-angle image is stored and (2) the angle-of-view information is set as metadata, in accordance with the predetermined object being not entirely within the image region specified by the angle-of-view information.

2. The image processing apparatus according to claim 1, wherein the file generator sets the wide-angle image as a main image of the image file.

3. The image processing apparatus according to claim 1, wherein the wide-angle image is an image generated based on an image synthesized by combining the captured image and a rendered image.

4. The image processing apparatus according to claim 1, wherein the file generator (1) sets the display image as a main image of the image file when generating the image file in which the display image is stored and (2) sets the wide-angle image as the main image of the image file when generating the image file in which the wide-angle image is stored.

5. The image processing apparatus according to claim 1, further comprising a reduced image generator that acquires the display image and that generates a reduced image of the display image,
   wherein the file generator sets the reduced image as a thumbnail image of the image file.

6. The image processing apparatus according to claim 1, wherein the angle-of-view information includes values specifying a horizontal angle of view and a vertical angle of view.

7. The image processing apparatus according to claim 1, wherein the angle-of-view information includes coordinates of opposite vertices of a rectangular region in the wide-angle image.

8. The image processing apparatus according to claim 1, further comprising:
   a first image generator that acquires the captured image and that generates the wide-angle image; and
   a second image generator that acquires the wide-angle image from the first image generator and that generates the display image.

9. The image processing apparatus according to claim 1, wherein the head-mounted display is a video see-through head-mounted display equipped with an imaging device.

10. An image processing method for a head-mounted display to display a display image based on a captured image, the method comprising:
   a reception step of receiving a user instruction to save a screenshot; and
   a file generation step of acquiring (1) a wide-angle image corresponding to the display image displayed on the head-mounted display at a time of the issuance of the user instruction, the wide-angle image being an image wider in angle of view than the display image, and (2) angle-of-view information including an angle of view of the display image,
   wherein the file generation step generates an image file having a predetermined file format in which the display image is stored, in accordance with a predetermined object being entirely within an image region specified by the angle-of-view information, and
   wherein the file generation step generates an image file having a predetermined file format in which (1) the wide-angle image is stored and (2) the angle-of-view information is set as metadata, in accordance with the predetermined object being not entirely within the image region specified by the angle-of-view information.

11. A non-transitory computer-readable storage medium storing a program causing a computer to execute an image processing method for a head-mounted display to display a display image based on a captured image, the method comprising:
   a reception step of receiving a user instruction to save a screenshot; and
   a file generation step of acquiring (1) a wide-angle image corresponding to the display image displayed on the head-mounted display at a time of the issuance of the user instruction, the wide-angle image being an image wider in angle of view than the display image, and (2) angle-of-view information including an angle of view of the display image,
   wherein the file generation step generates an image file having a predetermined file format in which the display image is stored, in accordance with a predetermined object being entirely within an image region specified by the angle-of-view information, and
   wherein the file generation step generates an image file having a predetermined file format in which (1) the wide-angle image is stored and (2) the angle-of-view information is set as metadata, in accordance with the predetermined object being not entirely within the image region specified by the angle-of-view information.

* * * * *